(12) United States Patent
Jing

(10) Patent No.: US 11,334,945 B2
(45) Date of Patent: May 17, 2022

(54) METHOD AND DEVICE FOR PROCESSING TRANSACTION REQUEST IN BLOCKCHAIN, ELECTRONIC APPARATUS, AND STORAGE MEDIUM

(71) Applicant: Baidu Online Network Technology (Beijing) Co., Ltd., Beijing (CN)

(72) Inventor: Bo Jing, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 20 days.

(21) Appl. No.: 16/952,173

(22) Filed: Nov. 19, 2020

(65) Prior Publication Data
US 2021/0319508 A1 Oct. 14, 2021

(30) Foreign Application Priority Data
Apr. 8, 2020 (CN) .......................... 202010268452.3

(51) Int. Cl.
*G06Q 20/38* (2012.01)
*G06Q 40/04* (2012.01)
(Continued)

(52) U.S. Cl.
CPC ......... *G06Q 40/04* (2013.01); *G06F 16/2365* (2019.01); *G06F 16/2379* (2019.01); *G06Q 20/389* (2013.01); *G06Q 30/0283* (2013.01)

(58) Field of Classification Search
None
See application file for complete search history.

(56) References Cited

U.S. PATENT DOCUMENTS 7,509,370 B1 * 3/2009 Branda .................. G06F 9/466
709/201
2017/0212781 A1 * 7/2017 Dillenberger ......... G06F 9/5038
(Continued)

FOREIGN PATENT DOCUMENTS

CN 108537543 A 9/2018
WO 2019/092544 A1 5/2019
(Continued)

OTHER PUBLICATIONS

Pervez, "A Comparative Analysis of DAG-Based Blockchain Architectures", Pakistan Inst. of Engineering and Applied Sciences, Dec. 2018. (Year: 2018).*

(Continued)

*Primary Examiner* — Abdulmajeed Aziz
(74) *Attorney, Agent, or Firm* — Faegre Drinker Biddle & Reath LLP

(57) ABSTRACT

A method and device for processing a transaction request in a blockchain, an apparatus and a medium are provided, which are related to blockchain technology. The method includes: determining at least one transaction request set according to one or more dependency relationships among one or more transaction requests in a blockchain network; and determining a target transaction request set from the at least one transaction request set, to generate a block by performing one or more transaction requests in the target transaction request set. Reasonability of a blockchain node in selecting a transaction request during a block generation process may be improved.

13 Claims, 6 Drawing Sheets

(51) Int. Cl.
  *G06F 16/23*   (2019.01)
  *G06Q 30/02*   (2012.01)

(56) References Cited

U.S. PATENT DOCUMENTS

| | | | | |
|---|---|---|---|---|
| 2018/0158034 | A1* | 6/2018 | Hunt | G06Q 20/027 |
| 2018/0374086 | A1* | 12/2018 | Ardashev | G06F 16/219 |
| 2019/0205773 | A1* | 7/2019 | Ackerman | G06Q 10/067 |
| 2019/0354397 | A1* | 11/2019 | Goel | G06F 9/4881 |
| 2020/0044824 | A1* | 2/2020 | Xie | H04L 9/0643 |
| 2020/0394176 | A1* | 12/2020 | Wu | G06F 16/9024 |
| 2021/0091957 | A1* | 3/2021 | Ford | H04L 67/10 |

FOREIGN PATENT DOCUMENTS

| | | | |
|---|---|---|---|
| WO | 2019/120320 | A1 | 6/2019 |
| WO | 2020/040809 | A1 | 2/2020 |

OTHER PUBLICATIONS

European Patent Office; European Search Report; EP Application No. 21164026.3; dated Sep. 21, 2021; 8 pages.

Antonopoulos, Andreas M.; Mastering Bitcoin; retrieved from www.oreilly.com/library/view/mastering-bitcoin-2nd/9781491954379; Jul. 21, 2017.

Japanese Patent Office; Japanese Office Action and Search Report; Japanese Application No. 2021-047402; dated Feb. 1, 2022; 8 pages.

Consensus Base Inc.; Textbook for provides a solid understanding of blockchain mechanisms and development in a single volume; 1st edition; Japan; Gijutsu Hyoronsha Co.; Sep. 14, 2019; p. 96.

Itoh, Hiroo, Data Structures and Algorithms 1st edition; Corona Publishing Co.; Sep. 28, 2017; pp. 54-65.

\* cited by examiner

METHOD AND DEVICE FOR PROCESSING TRANSACTION REQUEST IN BLOCKCHAIN, ELECTRONIC APPARATUS, AND STORAGE MEDIUM

CROSS-REFERENCE TO RELATED APPLICATIONS

This application claims priority to Chinese patent application, No. 202010268452.3, entitled "Method and Device for Processing Transaction Request in Blockchain, Electronic Apparatus and Storage Medium", filed with the Chinese Patent Office on Apr. 8, 2020, which is hereby incorporated by reference in its entirety.

TECHNICAL FIELD

Embodiments of the present application relate to computer technology, in particular to blockchain technology, and more specifically, to a method and device for processing a transaction request in a blockchain, an apparatus, and a storage medium.

BACKGROUND

At present, in a blockchain network with a block-generation reward mechanism, a block-generation node generally sort a large number of transactions according to the level of handling fees of the transactions, in order to select a transaction to be processed.

However, the number of transactions that a block-generation node may handle is generally limited. If a transaction to be processed is selected according to the handling fee, dependency relationships between transactions will be easily ignored, which will lead to errors in subsequent transaction processing.

SUMMARY

A method and device for processing a transaction request in a blockchain, an apparatus and a medium are provided according to embodiments of the present application.

In a first aspect, a method for processing a transaction request in a blockchain is provided according to an embodiment of the present application. The method includes:

determining at least one transaction request set according to one or more dependency relationships among one or more transaction requests in a blockchain network; and determining a target transaction request set from the at least one transaction request set, to generate a block by performing one or more transaction requests in the target transaction request set.

In a second aspect, a device for processing a transaction request in a blockchain is further provided according to an embodiment of the present application. The device includes:

a set determination module, configured to determine at least one transaction request set according to one or more dependency relationships among one or more transaction requests in a blockchain network; and a set selection module, configured to determine a target transaction request set from the at least one transaction request set, to generate a block by performing one or more transaction requests in the target transaction request set.

In a third aspect, an electronic apparatus is further provided according to an embodiment of the present application. The electronic apparatus includes:

at least one processor; and a memory communicatively connected to the at least one processor, wherein the memory stores instructions executable by the at least one processor, the instructions are executed by the at least one processor to enable the at least one processor to perform the method for processing a transaction request in a blockchain as described in any one of embodiments of the present application.

In a fourth aspect, a non-transitory computer readable storage medium for storing computer instructions is provided according to an embodiment of the present application. The computer instructions, when executed by a computer, cause the computer to perform for processing a transaction request in a blockchain as described in any one of embodiments of the present application.

According to technical solutions of embodiments of the present application, during a block generation process, a blockchain node aggregates various transaction requests and divides them into groups according to dependency relationships between transaction requests, to obtain at least one transaction request set, and then determines transaction requests participating in the block generation process by taking a set as unit, which may effectively ensure that dependency relationships between transaction requests during a transaction request process may be taken into account, thereby improving reasonability of a blockchain node in selecting a transaction request.

It should be understood that the content described herein is not intended to denote key or critical elements of embodiments of the present application nor to limit the scope of the present application. Further features of the present application may be readily understood from the following description.

BRIEF DESCRIPTION OF THE DRAWINGS

The drawings are used to better understand the scheme and do not constitute a limitation to the present application, wherein.

DETAILED DESCRIPTION

The exemplary embodiments of the application will be described below in combination with drawings, including various details of the embodiments of the present application to facilitate understanding, which should be considered as exemplary only. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness.

Figure 1:
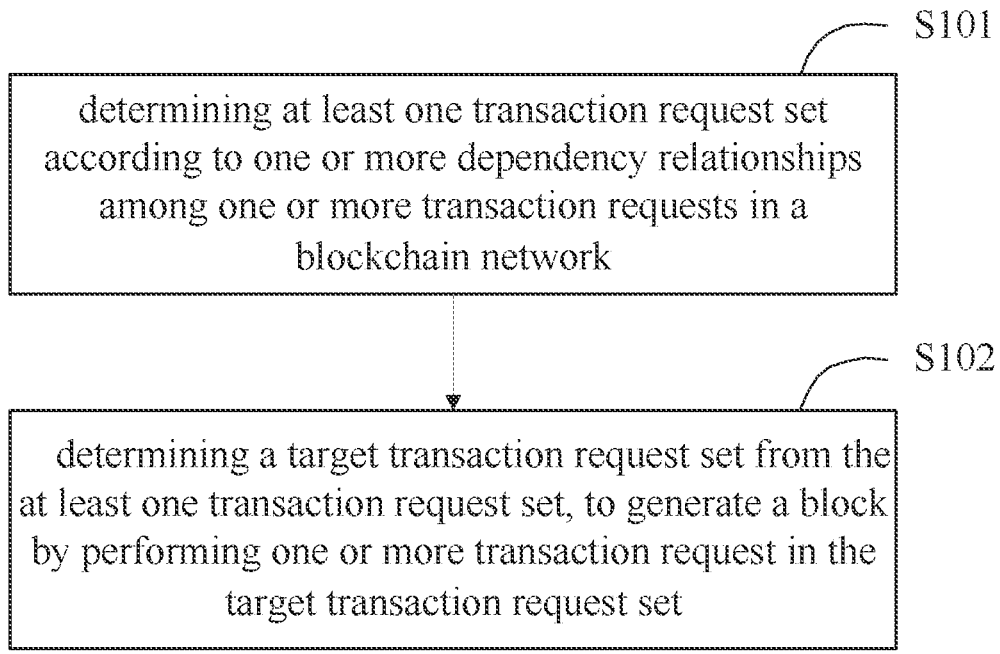
FIG. 1 is a flowchart showing a method for processing a transaction request in a blockchain according to an embodiment of the present application.

FIG. 1 is a flowchart showing a method for processing a transaction request in a blockchain according to an embodiment of the present application. Embodiments of the present application may be applicable to situations where a transaction request to be processed is reasonably selected by a blockchain node during a block generation process. The method according to embodiments of the present application may be performed by a device for processing a transaction request in a blockchain. The device may be implemented by using software and/or hardware and may be integrated on a blockchain node. A blockchain node may be deployed in any electronic apparatus with computational functions.

As shown in FIG. 1, the method for processing a transaction request in a blockchain according to an embodiment of the present application may include:

S101, determining at least one transaction request set according to one or more dependency relationships among one or more transaction requests in a blockchain network.

A dependency relationship among one or more transaction requests refers to the situation that in a process of performing a certain transaction request, processing results of other transaction requests need to be taken into account, or during an execution of other transaction requests, processing result of a current transaction request needs to be taken into account. Based on dependency relationships between one or more transaction requests in a blockchain network, at least one transaction request with a dependency relationship may be aggregated, to obtain at least one transaction request set (also referred to as a transaction request sequence), that is, at least one transaction request in each transaction request set may have a dependency relationship. The number of transaction requests included in respective transaction request sets depends on situation.

Figure 2:
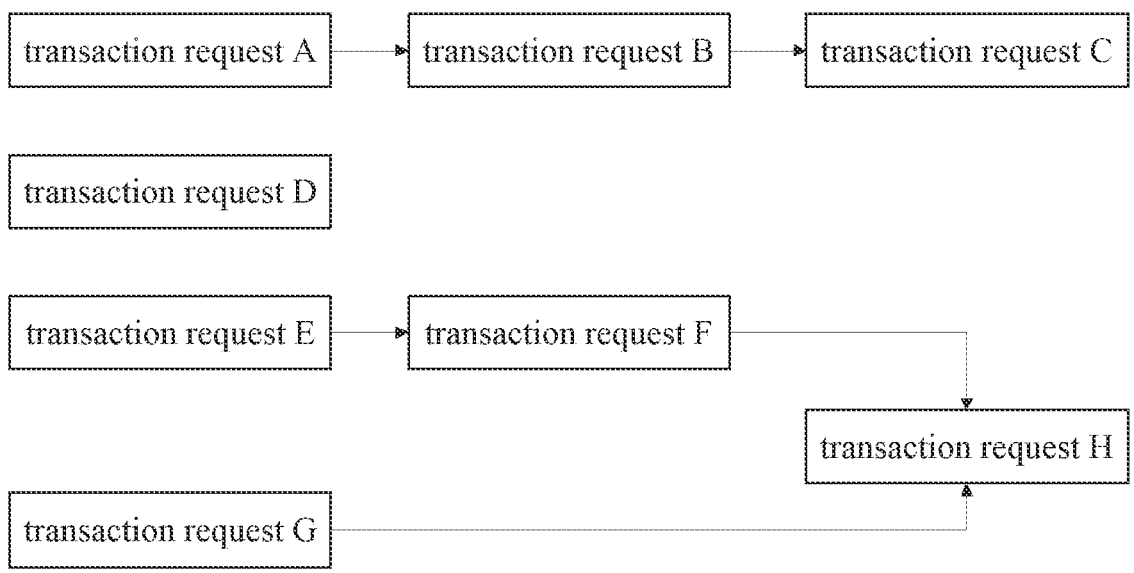
FIG. 2 is a schematic diagram showing dependency relationships among multiple transaction requests according to an embodiment of the present application.

Taking FIG. 2 as an example, it is a schematic diagram showing dependency relationships among multiple transaction requests, which should not be understood as a specific limitation to an embodiment of the present application. As shown in FIG. 2, a transaction request A depends on a transaction request B, the transaction request B depends on a transaction request C, thus the transaction request A, the transaction request B, and the transaction request C may form a transaction request set 1. A transaction request D is an independent transaction request, which does not depend on other transaction requests, thus the transaction request D may form a transaction request set 2 by itself. A transaction request E depends on a transaction request F, the transaction request F depends on a transaction request H, further, a transaction request G depends on the transaction request H, therefore, the transaction request E, the transaction request F, the transaction request H, and the transaction request G may form a transaction request set 3.

S102, determining a target transaction request set from the at least one transaction request set, to generate a block by performing one or more transaction requests in the target transaction request set.

During a selection process of a target transaction request set, each transaction request set may be comprehensively evaluated based on one or more of factors including the number of transaction requests included in each transaction request set, payment vouchers of the transaction requests, space occupation sizes of the transaction requests, priorities of the transaction requests, and the like, to select a target transaction request set. The payment voucher of a transaction request, which is also referred to as a handling fee, indicates benefit that a blockchain node may obtain after performing the transaction request. The priority of a transaction request may be determined by a blockchain system according to factors including a business type, generation time, importance, and business value, and the like involved in a transaction request, or may be specified by the blockchain node itself, which is not limited specifically in the embodiment of the present application.

Exemplarily, a transaction request set in at least one transaction request sets, in which the number of transaction requests included in the transaction request set exceeds a first number threshold, may be determined as a target transaction request set. Alternatively, a transaction request set in at least one transaction request sets, in which a total payment voucher of the transaction requests included in the transaction request set exceeds a voucher threshold may be determined as a target transaction request set. Alternatively, a transaction request set in at least one transaction request sets, in which the number of transaction requests with higher priorities included in the transaction request set exceeds a second number threshold may be determined as a target transaction request set. Alternatively, a transaction request set in at least one transaction request sets, in which a total space occupation size of the transaction requests included in the transaction request set is less than or equal to a set space threshold may be determined as a target transaction request set. Alternatively, a transaction request set in at least one transaction request sets, in which a ratio of a total payment voucher to a total space occupation size of the transaction requests included in the transaction request set is greater than a ratio threshold may be determined as a target transaction request set. The values of the foregoing various thresholds may be flexibly set according to requirements. The selection strategy of a target transaction request set is not limited to the foregoing examples, those skilled in the art may flexibly change or adjust the foregoing examples according to requirements, to enable a blockchain node to reasonably select a target transaction request set.

In a blockchain network deployed with a block-generation reward mechanism, each time a blockchain node executes a transaction request, it will receive a corresponding reward (or benefit), such as obtaining a certain number of payment vouchers. Generally, when the difference in payment vouchers between respective transaction requests is smaller, the larger the number of transaction requests processed by a blockchain node, the more rewards will be obtained. For transaction requests with higher priorities, higher payment vouchers may be set. Therefore, the greater the number of transaction requests with higher priorities executed by a blockchain node, the more rewards will be obtained. Further, considering that there is a limit on the space size of blocks, that is, the number of transaction requests executable by a blockchain node is limited, it is necessary to choose to process more transaction requests as possible according to space occupation sizes of the transaction requests. Alternatively, it is possible to comprehensively evaluate a transaction request set according to the relationship between a total payment voucher and a total space occupation size in the transaction request set, so that the reward of a blockchain node may be ensured, while a target transaction request set may also be determined.

After a blockchain node determines a target transaction request set, it may generate transaction data by performing each transaction request in the target transaction request set, and generate a block based on the transaction data.

According to technical solutions of embodiments of the present application, during a block generation process, a blockchain node aggregates various transaction requests and divides them into groups according to dependency relationships between transaction requests, to obtain at least one transaction request set, and then determines transaction requests participating in the block generation process by taking a set as unit, which may effectively ensure that dependency relationships between transaction requests during a transaction request process may be taken into account. This solves the problem that a transaction to be processed is selected one after the other according to the handling fee, dependency relationships between transactions will be easily ignored, which will lead to errors in subsequent transaction processing. In this way, reasonability of a blockchain node in selecting a transaction request is improved on the basis of guaranteeing a certain reward benefit of a block-generation node.

Based on the foregoing technical solution, optionally, after the determining the target transaction request set from the at least one transaction request set, the method according to an embodiment of the present application may further include following steps.

At least one new transaction request set is determined according to one or more dependency relationships among one or more remaining transaction requests, if a space occupation size of the determined target transaction request set is less than a block space threshold, and a new target transaction request set is determined according to the new transaction request set, wherein the one or more remaining transaction requests include a transaction request, other than the one or more transaction requests in the target transaction request set, in the blockchain network. The block space threshold is related to the space size of a block in a blockchain network, and may be used to reflect the upper limit of the space size of a block. That is, the total space occupation size of target transaction request sets cumulatively selected by a blockchain node needs to be within a block space accommodation range. The specific value of a block space threshold may be set reasonably, which is not specifically limited in the embodiment of the present application.

If a space occupation size of currently determined target transaction request sets is less than a block space threshold, the steps S101 to S102 may be continuously performed repeatedly based on remaining transaction requests in a blockchain network, until the space occupation size of cumulatively determined target transaction request sets is equal to the block space threshold, that is, the upper limit of a block size is reached.

If a space occupation size of currently determined target transaction request sets is equal to a block space threshold, the determination of a target transaction request set may come to an end, thereby entering a block generation stage.

Figure 3:
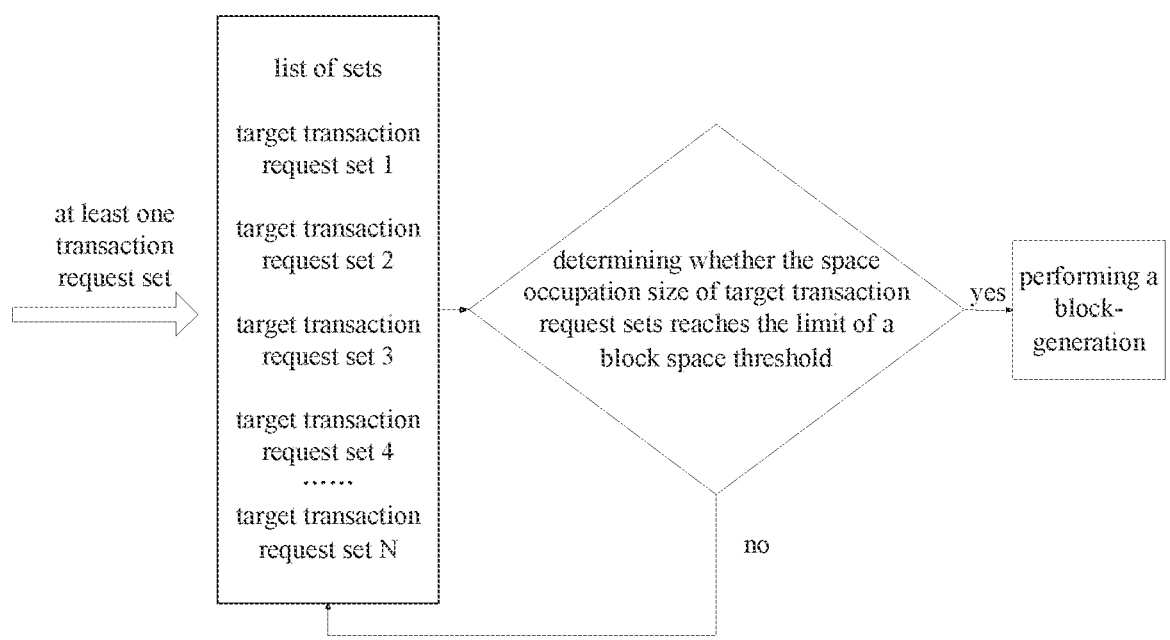
FIG. 3 is flowchart showing a method for processing a transaction request in a blockchain according to another embodiment of the present application.

As an example, FIG. 3 is flowchart showing a method for processing a transaction request in a blockchain according to another embodiment of the present application. As shown in FIG. 3, after generating at least one transaction request set according to one or more dependency relationships between one or more transaction requests in a blockchain network, a target transaction request set may be determined from the at least one transaction request set according to a set selection strategy. Each time a target transaction request set is determined, it may be recorded in a list of sets. The determination of a target transaction request set may be repeatedly performed, until the space occupation size of cumulatively determined target transaction request sets reaches the threshold limit of a block space threshold, and then a block generation process may be entered.

In an embodiment of the present application, based on a block space threshold, execution times of selecting a target transaction request set are controlled, so that a block space may be fully utilized while ensuring that a blockchain node obtains a block-generation reward. In this way, block-generation reward benefit of a blockchain node may be maximized as much as possible. Further, as shown in FIG. 3, after multiple target transaction request sets are determined, the multiple target transaction request sets may be combined and adjusted according to a total space occupation size of the target transaction request sets, such that a cumulative space occupation size does not exceed a block space threshold. In this way, the utilization of a block space is maximized, to obtain target transaction request sets participating in a block generation process. For example, it is assumed that in FIG. 3, a cumulative space occupation size of previous three target transaction request sets is less than a block space threshold. However, if the fourth target transaction request set selected in sequence is directly added, the cumulative space occupation size of the previous four target transaction request sets will be greater than the block space threshold. In this case, the fourth target transaction request set may be skipped, and for example, the fifth or the Nth target transaction request set determined in sequence may be added, to ensure that cumulative space occupation size does not exceed or at most be equal to the block space threshold.

Figure 4:
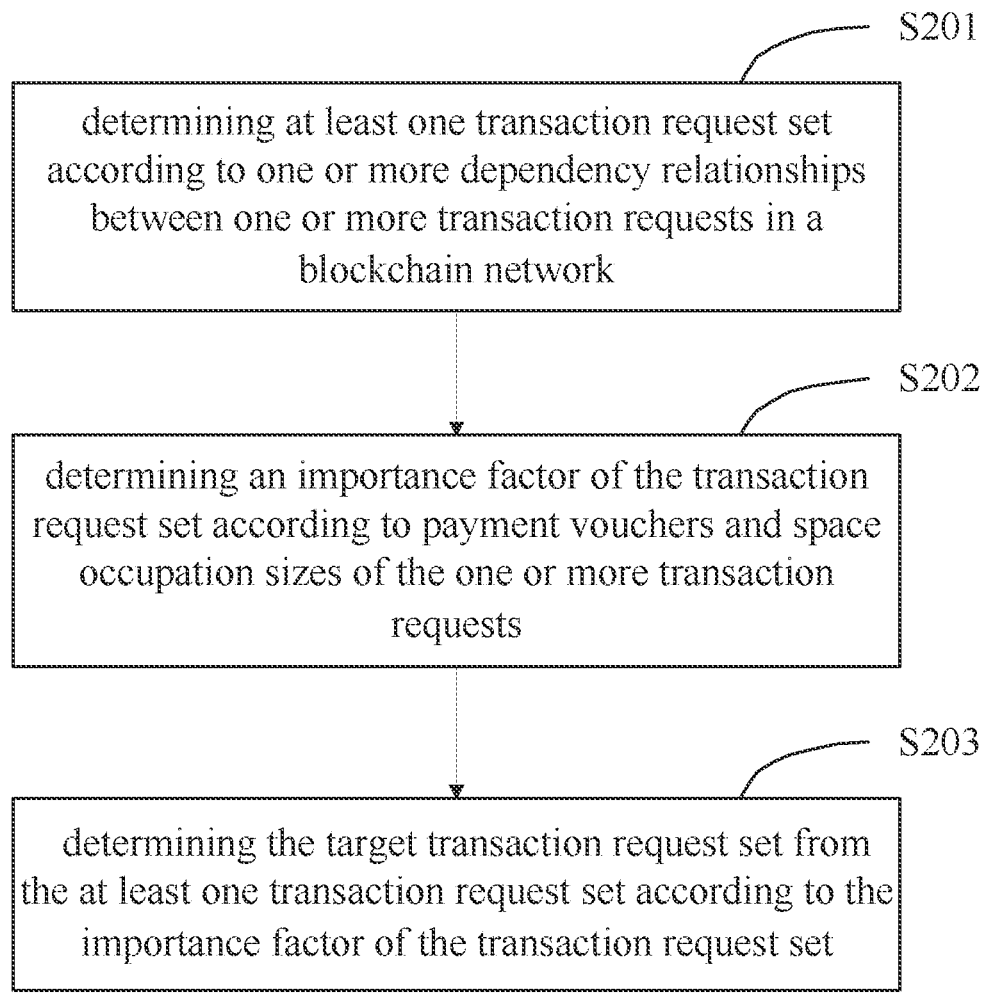
FIG. 4 is flowchart showing a method for processing a transaction request in a blockchain according to yet another embodiment of the present application.

FIG. 4 is flowchart showing a method for processing a transaction request in a blockchain according to yet another embodiment of the present application, which is further optimized and developed based on above technical solutions, and may be combined with above various optional embodiments. As shown in FIG. 4, the method may include:

S201, determining at least one transaction request set according to one or more dependency relationships between one or more transaction requests in a blockchain network.

S202, determining an importance factor of the transaction request set according to payment vouchers and space occupation sizes of the one or more transaction requests.

The payment voucher of a transaction request indicates benefit that a blockchain node may obtain after performing the transaction request. The importance factor, as an evaluation indicator of a transaction request set, may effectively guarantee that a blockchain node may obtain more payment vouchers while ensuring that the blockchain node reasonably selects a transaction requests to be processed, so that the benefit of a blockchain node during a block generation process may be maximized as much as possible, and a more effective and reasonable incentive calculation model in a blockchain network may be constructed, to ensure a normal and timely generation of blocks.

For example, if a blockchain node selects a currently transaction request to be processed solely based on the level of handling fee, dependency relationships between transaction requests cannot be taken into account. Further, a block space is limited, and the number of transaction requests that a blockchain node may execute is also limited, if the space occupation size of a transaction request with a higher handling fee is relatively large, the number of transaction requests that a blockchain node may execute will be smaller, despite the relative high handling fee of an individual transaction request, thus, a final payment voucher will not be with an optimal value. Therefore, the selection of transaction requests by a blockchain node is still unreasonable, which cannot achieve effectively incentive function on a blockchain node for participating in a block generation. By applying the technical solution of an embodiment of the present application, payment vouchers and space occupation sizes of transaction requests may be comprehensively considered, the problem of unreasonably selecting transaction requests solely based on the level of handling fee may be solved.

Based on payment vouchers and space occupation sizes of transaction requests, a calculation formula of importance factor preset in a blockchain network may be used, to calculate the importance factor for each transaction request set. As long as it may be ensured that the calculation of importance factors is reasonable, the specific form of a calculation formula of importance factor is not limited according to embodiments of the present application.

Exemplarily, the determining an importance factor of a transaction request set according to payment vouchers and space occupation sizes of one or more transaction requests includes:

calculating a total payment voucher of all the transaction requests in the transaction request set, that is, the sum of payment vouchers of all transaction requests;

calculating a total space occupation size of all the transaction requests in the transaction request set, that is, the sum of space occupation sizes (sum_size) of all transaction requests; and taking a quotient of the total payment voucher and the total space occupation size as an importance factor of the transaction request set.

Further, an importance factor of a transaction request set may also be referred to as cost performance of the transaction request set.

S203, determining the target transaction request set from the at least one transaction request set according to the importance factor of the transaction request set.

Exemplarily, respective transaction request sets may be sequenced according to importance factors of the respective transaction request sets, and then a target transaction request set may be determined according to the sequenced result. For example, the first transaction request set in the sequence is determined as a target transaction request set. Further, importance factors may also be used to construct a maximum heap. A transaction request set corresponding to a root node of the maximum heap may be determined as a target transaction request set. Alternatively, a target transaction request set may be determined according to relationships between importance factors of respective transaction request sets and a factor threshold. For example, transaction request sets with importance factors exceeding a factor threshold may be determined as a target transaction request set, where the value of the factor threshold may be set reasonably.

After a blockchain node determines a target transaction request set, it may generate a block by executing one or more transaction requests in the target transaction request set.

According to the technical solution of an embodiment of the present application, after at least one transaction request set are obtained by a blockchain node according to one or more dependency relationships between one or more transaction requests, importance factor, which may be used to comprehensively evaluate the transaction request set, are calculated based on payment vouchers and space occupation sizes of the transaction requests, and then a target transaction request set participating in a block generation process is selected based on the importance factor. In this way, it is guaranteed that a blockchain node may obtain more payment vouchers while ensuring that the blockchain node reasonably selects transaction requests to be processed, and a more effective and reasonable reward calculation model is provided for a blockchain network, thereby realizing an effective incentive for a blockchain node to participate in a block generation, and ensuring a normal and timely generation of blocks.

It should be noted that technical solutions of embodiments of the present application may be applied to any type of blockchain network, including but not limited to a consortium blockchain network, an open chain network, and the like. Preferably, technical solutions of embodiments of the present application may be applied in a blockchain network deployed with a consensus mechanism for non-competitively generating a block, for example, in a blockchain network deployed with a consensus mechanism for periodically generating blocks in-turn. In a blockchain network deployed with a consensus mechanism for non-competitively generating a block, different blockchain nodes do not need to compete for billing rights. Therefore, a blockchain node may use relatively sufficient time, without considering time cost, to select transaction requests to be processed by executing technical solutions of embodiments of the present application. In this way, a more reasonable transaction request selection mode during a block generation process is provided for nodes in a blockchain network deployed with a consensus mechanism for non-competitively generating a block, which may effectively stimulate a blockchain node to participate in generating blocks.

Figure 5:
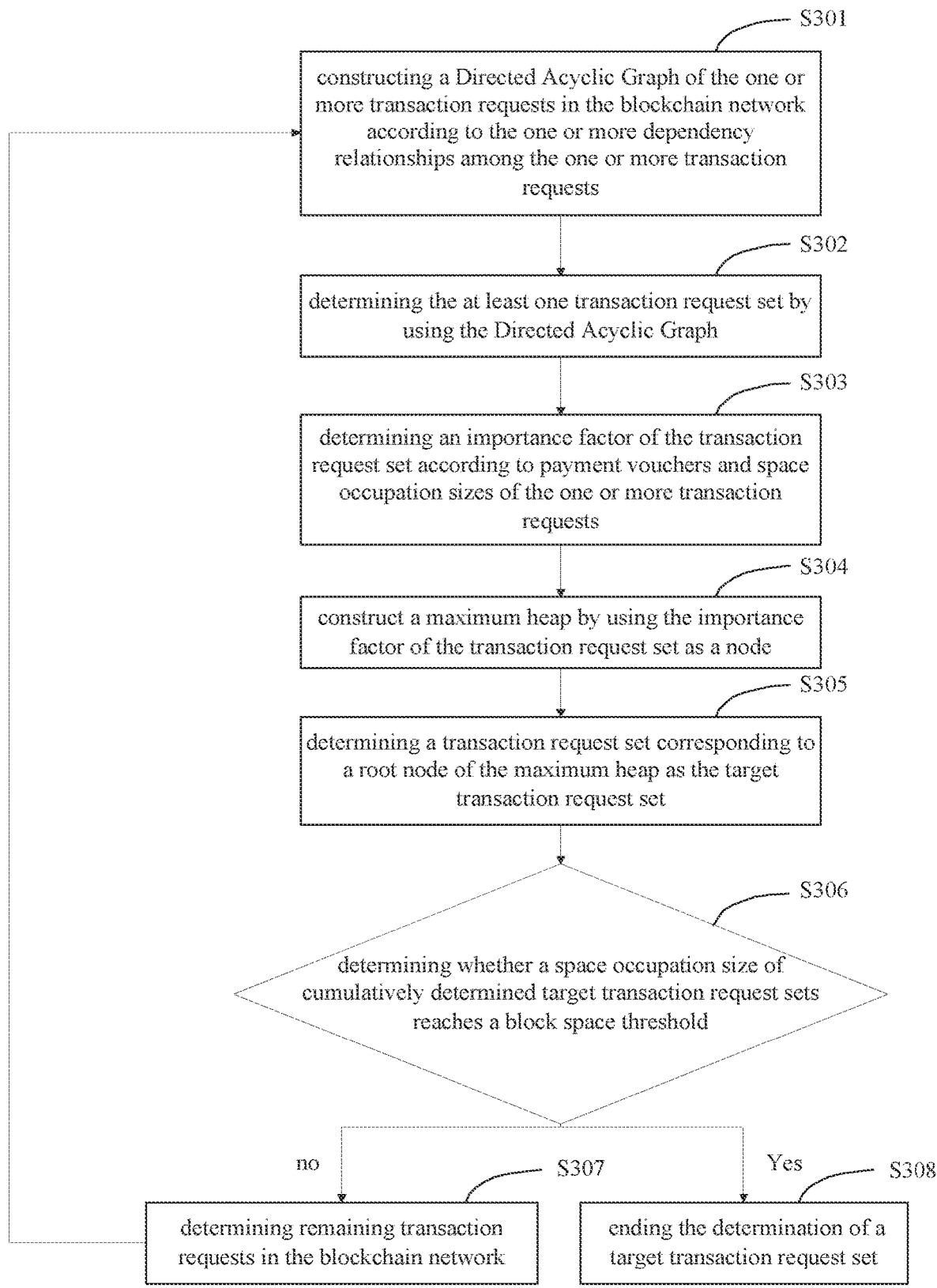
FIG. 5 is flowchart showing a method for processing a transaction request in a blockchain according to yet another embodiment of the present application.

FIG. 5 is flowchart showing a method for processing a transaction request in a blockchain according to yet another embodiment of the present application, which is further optimized and developed based on above technical solutions, and may be combined with above various optional embodiments. As shown in FIG. 5, the method may include:

S301, constructing a Directed Acyclic Graph of the one or more transaction requests in the blockchain network according to the one or more dependency relationships among the one or more transaction requests.

S302, determining the at least one transaction request set by using the Directed Acyclic Graph.

Specifically, each transaction request may be taken as a node of a Directed Acyclic Graph (DAG), and dependency relationships between transaction requests may be taken as edges of a DAG. By constructing a DAG, dependency relationships between various transaction requests may be managed in an organized manner. Further, a DAG has higher scalability, which means it may be flexibly changed with an increase or decrease of the number of transaction requests. In addition, a transaction request set determined based on a DAG includes leaf transaction requests and various non-leaf transaction requests on which the leaf transaction requests depend, where the leaf transaction requests represents transaction requests corresponding to leaf nodes in a DAG, and the non-leaf transaction requests represents transaction requests corresponding to non-leaf nodes in a DAG. A leaf transaction request in a transaction request set is different from a leaf transaction request in another transaction request set.

Example I: taking dependency relationships between multiple transaction requests shown in FIG. 2 as an example, three transaction request sets may be determined, which are as follows, respectively:

Transaction request set 1: Transaction request A→Transaction request B→Transaction request C;

Transaction request set 2: Transaction request D;

Transaction request set 3: Transaction request E→Transaction request F→Transaction request H, and transaction request G→Transaction request H.

In the Transaction request set 1, the Transaction request A is a leaf transaction request, and the Transaction request B and the Transaction request C are non-leaf transaction requests on which a leaf transaction request depends on, respectively.

In the Transaction request set 2, the Transaction request D is an independent transaction request.

In the Transaction request set 3, the Transaction request E and the Transaction request G are leaf transaction requests, the Transaction request F and the Transaction request H are non-leaf transaction requests on which the leaf Transaction request E depends on, and the Transaction request H is a non-leaf transaction request on which the leaf Transaction request G depends on.

Example II: it is assumed that a transaction request may correspond to a transaction, and there are following dependency relationships between multiple transactions: Transaction 2 depends on Transaction 1, Transaction 3 depends on Transaction 2, and Transaction 4 depends on Transaction 3, transaction request sets or transaction sequences may be then expressed as follows:

Transaction sequence 1: Transaction 1;
Transaction sequence 2: Transaction 2→Transaction 1;
Transaction sequence 3: Transaction 3→Transaction 2→Transaction 1;
Transaction sequence 4: Transaction 4→Transaction 3→Transaction 2→Transaction 1.

In the Transaction sequence 1, the Transaction 1 is an independent transaction.

In the Transaction sequence 2, the Transaction 2 is a leaf transaction, and the Transaction 1 is a non-leaf transaction (also referred to as an ancestor transaction).

In the Transaction sequence 3, the Transaction 3 is a leaf transaction, and the Transaction 2 and the Transaction 1 are non-leaf transactions, respectively.

In the Transaction sequence 4, the Transaction 4 is a leaf transaction, and the Transaction 3, the Transaction 2 and the Transaction 1 are non-leaf transactions, respectively.

Moreover, it can also be seen from above examples when there exist same dependency relationships between multiple transaction requests, each transaction request set includes the most initial dependent transaction request (also referred to as an oldest ancestor transaction request). For example, in the above example, the oldest ancestor transaction: the Transaction 1 is included in the Transaction sequence 2 to the Transaction sequence 4, respectively.

S303, determining an importance factor of the transaction request set according to payment vouchers and space occupation sizes of the one or more transaction requests.

S304, construct a maximum heap by using the importance factor of the transaction request set as a node.

305, determining a transaction request set corresponding to a root node of the maximum heap as the target transaction request set.

Figure 6:
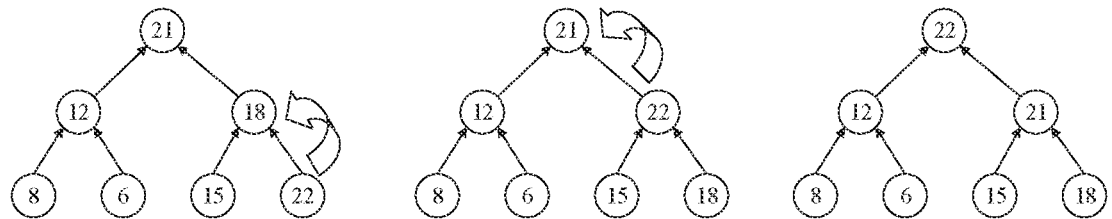
FIG. 6 is a schematic diagram showing a construction of a maximum heap based on importance factors of a transaction request set according to an embodiment of the present application.

The maximum heap is a form of a binary tree, the root node (also referred to as the top of a heap) has a maximum value. As an example, FIG. 6 shows a schematic diagram for constructing a maximum heap. As shown in FIG. 6, it is assumed that 7 transaction request sets are determined based on dependency relationships between transaction requests in a blockchain network, and importance factors of the transaction request sets are 21, 12, 18, 8, 6, 15, and 22 respectively, an initial binary tree is then constructed by taking the 7 importance factors as values of respective nodes, as shown in a first subgraph in FIG. 6. Then, values of adjacent nodes are compared successively from bottom to top, and a node with a larger value is exchanged to a node in an upper layer, as shown in a second subgraph in FIG. 6, where the second subgraph is obtained by exchanging the position of the node with a value of 22 and the position of the node with a value of 18 in the first subgraph. Since until now, the requirement for forming a maximum heap is not met yet, it is necessary to continue to check all nodes with values, in order to determine whether further a position exchange of nodes is required to be performed from bottom to top. For example, the position of the node with a value of 22 and the position of the node with a value of 21 in the second subgraph is required to be exchanged. In this way, a third subgraph in FIG. 6 may be obtained. At this time, the transaction request set corresponding to the node with a value of 22, that is, the transaction request set with an importance factor of 22, is a target transaction request set.

Benefiting from inherent characteristics of the maximum heap, selecting a target transaction request set by using a maximum heap may ensure the efficiency of a determination of a target transaction request set.

S306, determining whether a space occupation size of cumulatively determined target transaction request sets reaches a block space threshold.

A block space threshold is related to the space size of a block in a blockchain network, and may be used to reflect the upper limit of the space size of the block. If it is determined that the space occupation size of cumulatively determined target transaction request sets is less than a block space threshold, S307 is performed to determine remaining transaction requests in the blockchain network and start a next cycle of determining a target transaction request set based on the remaining transaction requests in the blockchain network.

If it is determined that the space occupation size of cumulatively determined target transaction request sets is equal to a block space threshold, that is, it is considered that the upper limit of a block size is reached, S308 is then performed to end the determination of a target transaction request set, and a block packing process may be performed.

S307, determining remaining transaction requests in the blockchain network.

Remaining transaction requests include a transaction request, other than one or more transaction requests in a target transaction request set, in a blockchain network. In an initial stage, a list of transaction requests to be confirmed may be established for one or more transaction requests in a blockchain network, which is used to record transaction requests in the blockchain network, that are currently not confirmed to participate in a block generation process. Each time a target transaction request set is determined, the transaction requests included in the target transaction request set are removed from the list of transaction requests to be confirmed, thereby determining the remaining transaction requests in the blockchain network.

When the remaining transaction requests in the blockchain network are determined, S301 may be continued, that is, to construct a new DAG based on dependency relationships between remaining transaction requests. Then, at least one new transaction request set is determined based on the new DAG, importance factors of respective new transaction request sets are determined, a new maximum heap is constructed, and a new target transaction request set is determined by using the new maximum heap. If the space occupation size of cumulatively determined target transaction request sets does not reach a block space threshold, the operation of determining a target transaction request set may continue to be repeatedly performed, until the block space threshold is reached, and then the cycle may be ended. It should be noted that a new transaction request set refers to a transaction request set determined in a new cycle process during the process of determining a target transaction request set, and is not necessarily limited to a newly generated transaction request in a blockchain network.

S308, ending the determination of a target transaction request set.

Figure 7:
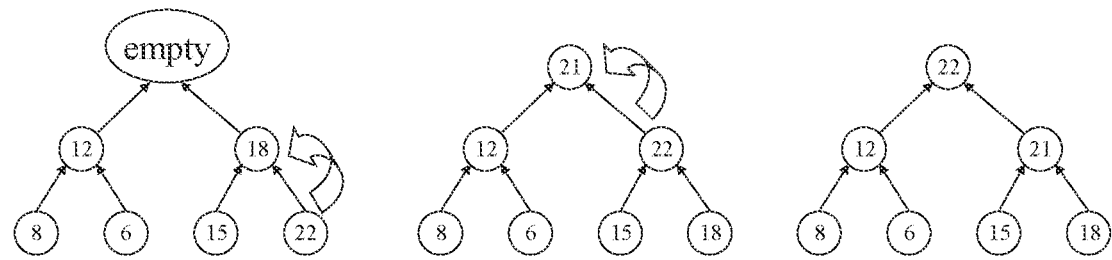
FIG. 7 is a schematic diagram showing another construction of a maximum heap based on importance factors of a transaction request set according to an embodiment of the present application.

In order to facilitate understanding of the construction process of a maximum heap in an embodiment of the present application, FIG. 7 is a schematic diagram showing another construction of a maximum heap, which should not be understood as a specific limitation to the embodiment of the present application. As shown in FIG. 7, it is assumed that the importance factor of the target transaction request set is 22 in the current cycle process, its corresponding root node may be removed from the current maximum heap, that is, the root node of the current maximum heap is empty. Further, if it is assumed that there are no transaction requests, in the current remaining transaction request sets, that are as same as (repeated with) the transaction request in the target transaction request set, for example, the situation as shown in FIG. 2 is the case, the determination of a target transaction request set will not affect the current remaining transaction request sets. Therefore, importance factors of remaining transaction request sets do not need to be changed, and in the next cycle process, the last node may be adjusted to the root node. Then, values of adjacent nodes are compared successively from bottom to top, and a node with a larger value is exchanged to a node in an upper layer, until a new maximum heap is obtained. As shown in a third subgraph in FIG. 7, the transaction request set corresponding to the root node with a value of 21 is a new target transaction request set.

FIG. 7, as an example, corresponds to a relatively simple situation. In a practical application, in multiple transaction request sets determined according to dependency relationship between transaction requests in a blockchain network, there usually exist repetitive transaction requests. For example, a transaction request set 1 includes: Transaction request 2→Transaction request 1, and a transaction request set 2 includes: Transaction request 3→Transaction request 2→Transaction request 1. After a target transaction request set is determined in a current cycle, in order to avoid consideration of repetitive transaction requests, in a next cycle, multiple new transaction request sets are re-determined by using remaining transaction requests, and importance factor of each new transaction request set is then determined. For example, assuming that a current target transaction request set includes the transaction request 1 and the transaction request 2, in the process of determining a new target transaction request set, there is no need to repeatedly consider the Transaction request 1 and the Transaction request 2. Therefore, in a process of constructing a new maximum heap based on a current maximum heap, there will be a situation in which a part of nodes in the current maximum heap will fail (that is, changes of transaction requests included in the transaction request set occur), and new nodes need to be added. In the case that transaction requests included in a transaction request set have not changed in different cycle processes, the importance factor of the transaction request set will not change, and therefore, its corresponding node in the maximum heap does not need to change.

Furthermore, on the basis of the above technical solution, optionally, after determining that the space occupation size of target transaction request sets cumulatively determined is less than a block space threshold, the determining at least one new transaction request set according to dependency relationships between remaining transaction requests in the blockchain network, and performing a determination of a new target transaction request set according to the new transaction request set includes:

determining a set, in the currently determined at least one transaction request set, with one or more transaction requests which are repeated with the one or more transaction requests in the current target transaction request set, as an invalid set, and determining the importance factor of the invalid set as an invalid node;

removing the invalid node from the current maximum heap, and removing a current root node from the current maximum heap, to obtain one or more remaining nodes;

determining at least one new transaction request set according to one or more dependency relationships between the one or more remaining transaction requests in the blockchain network, and determining a set, in the at least one new transaction request set, which is different from the currently determined at least one transaction request set, as a newly added set, and re-determining an importance factor of the newly added set;

using the importance factor of the newly added set as a newly added node;

re-constructing a new maximum heap by using the previously determined remaining nodes and the newly added node; and determining the transaction request set corresponding to a root node of the new maximum heap as a new target transaction request set.

For a newly added node, it may be added to any node in an existing maximum heap. As shown in the first subgraph in FIG. 6, the last node with a value of 22 may be regarded as a newly added node, which is gradually adjusted to the top of the heap by a comparison with adjacent nodes.

According to technical solutions of embodiments of the present application, during a process of selecting transaction requests to be processed, a blockchain node firstly determines at least one transaction request set by using a DAG, so that in a process of multiple cycle operations, calculation cost of re-determining a transaction request set may be minimized. Further, a selection of a target transaction request set by using a maximum heap may reduce the number of comparisons of important factors and improve the efficiency of determining a target transaction request set. In addition, in embodiments of the present application, transaction requests participating in block packaging are selected by comprehensively considering dependency relationships between the transaction requests, payment vouchers and space occupation sizes of the transaction requests, which guarantees that a blockchain node may obtain more payment vouchers while ensuring that the blockchain node reasonably selects transaction requests to be processed, thereby realizing an effective incentive for a blockchain node to participate in a block generation.

Figure 8:
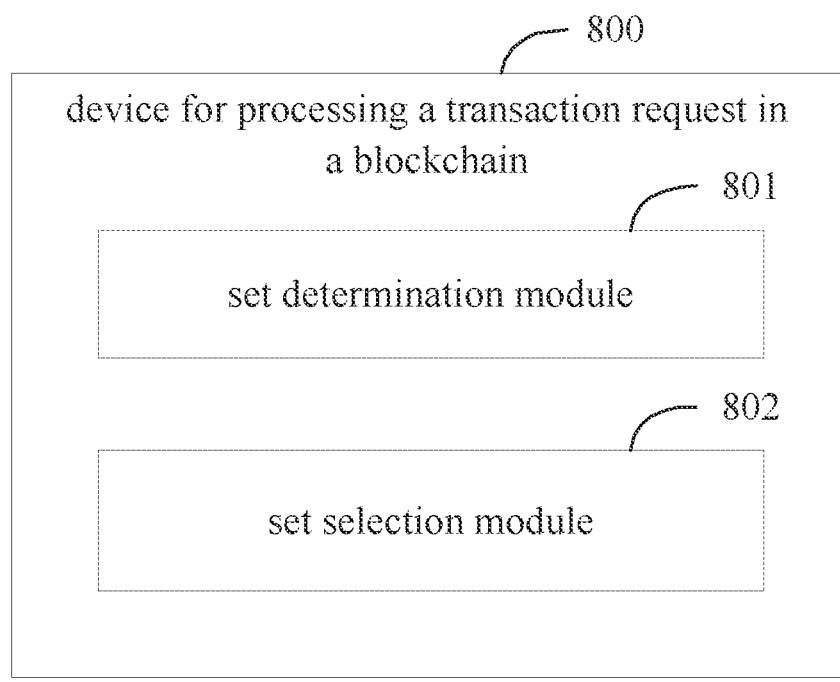
FIG. 8 is a schematic structural diagram showing a device for processing a transaction request in a blockchain according to an embodiment of the present application.

FIG. 8 is a schematic structural diagram showing a device for processing a transaction request in a blockchain according to an embodiment of the present application. Embodiments of the present application may be applicable to situations where a transaction request to be processed is reasonably selected by a blockchain node during a block generation process. The device according to embodiments of the present application may be implemented by using software and/or hardware and may be integrated on a blockchain node. A blockchain node may be deployed in any electronic apparatus with computational functions.

As shown in FIG. 8, the device 800 for processing a transaction request in a blockchain according to an embodiment of the present application may include a set determination module 801 and a set selection module 802, wherein the set determination module 801 is configured to determine at least one transaction request set according to one or more dependency relationships among one or more transaction requests in a blockchain network; and the set selection module 802 is configured to determine a target transaction request set from the at least one transaction request set, to generate a block by performing one or more transaction requests in the target transaction request set.

Optionally, the device according to an embodiment of the present application further includes:

a cyclic execution module, configured to determine, after the set selection module determines the target transaction request set from the at least one transaction request set, at least one new transaction request set according to one or more dependency relationships among one or more remaining transaction requests, if a space occupation size of the determined target transaction request set is less than a block space threshold, and to determine a new target transaction request set according to the new transaction request set;

wherein the one or more remaining transaction requests include a transaction request, other than the one or more transaction requests in the target transaction request set, in the blockchain network.

Optionally, the set selection module 802 includes:

an importance factor determination unit, configured to determine an importance factor of the transaction request set according to payment vouchers and space occupation sizes of the one or more transaction requests; and a set selection unit, configured to determine the target transaction request set from the at least one transaction request set according to the importance factor of the transaction request set.

Optionally, the set selection unit includes:

a maximum heap construction subunit, configured to construct a maximum heap by using the importance factor of the transaction request set as a node; and a target set determination subunit, configured to determine a transaction request set corresponding to a root node of the maximum heap as the target transaction request set.

Optionally, the set determination module 801 includes:

a Directed Acyclic Graph construction unit, configured to construct a Directed Acyclic Graph of the one or more transaction requests in the blockchain network according to the one or more dependency relationships among the one or more transaction requests: and a set determination unit, configured to determine the at least one transaction request set by using the Directed Acyclic Graph.

Optionally, the transaction request set includes a leaf transaction request and a non-leaf transaction request on which the leaf transaction request depends, and the leaf transaction request in the transaction request set is different from a leaf transaction request in another transaction request set.

Optionally, the importance factor determination unit includes:

a total payment voucher calculation subunit, configured to calculate a total payment voucher of all the transaction requests in the transaction request set;

a total space occupation size calculation subunit, configured to calculate a total space occupation size of all the transaction requests in the transaction request set; and an importance factor determination subunit, configured to take a quotient of the total payment voucher and the total space occupation size as the importance factor of the transaction request set.

Optionally, the blockchain network is deployed with a consensus mechanism for non-competitively generating a block.

The device 800 for processing a transaction request in a blockchain according to an embodiment of the present application may perform any method for processing a transaction request in a blockchain according to an embodiment of the present application, and includes corresponding function modules for performing the method and has corresponding beneficial effects. For contents not described in detail in device embodiments of the present application, reference may be made to descriptions in any method embodiment of the present application.

According to an embodiment of the present application, an electronic apparatus and a readable storage medium are provided in the present application.

Figure 9:
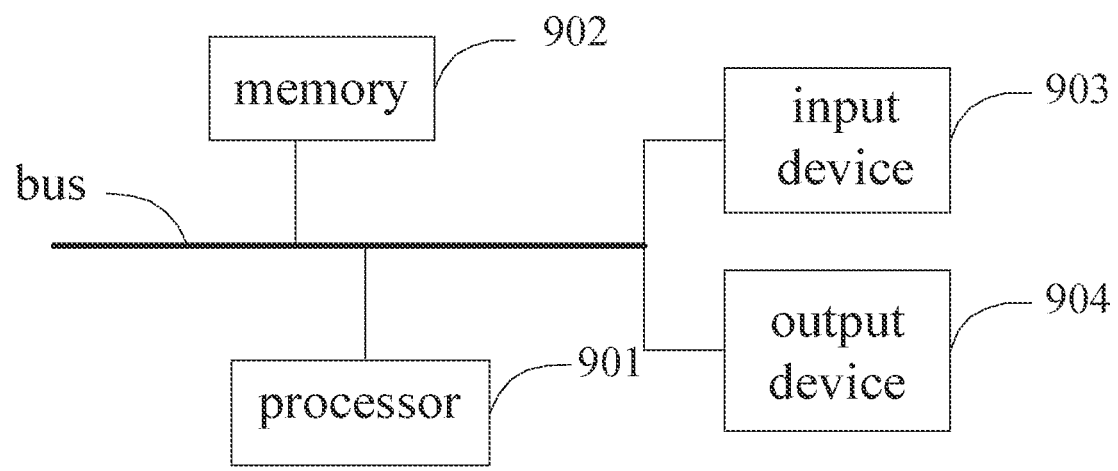
FIG. 9 is a block diagram showing an electronic apparatus according to an embodiment of the present application.

As shown in FIG. 9, it is a block diagram of an electronic apparatus for implementing a method for processing a transaction request in a blockchain according to an embodiment of the present application. Electronic apparatuses are intended to represent various forms of digital computers, such as laptop computers, desktop computers, workbenches, personal digital assistants, servers, blade servers, mainframe computers, and other suitable computers. Electronic apparatuses may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or claimed herein.

As shown in FIG. 9, the electronic apparatus includes: one or more processors 901, a memory 902, and interfaces for connecting various components, including a high-speed interface and a low-speed interface. The various components are connected to each other using different buses and may be installed on a common motherboard or installed in other ways as needed. The processor may process instructions executed within the electronic apparatus, including instructions which are stored in the memory or on the memory to display graphic information of a Graphical User Interface (GUI) on an external input/output device (such as a display apparatus coupled to the interface). In other embodiments, multiple processors and/or multiple buses may be used with multiple memories if desired. Similarly, multiple electronic apparatuses may be connected, and each apparatus provides a part of necessary operations, for example, as a server array, a group of blade servers, or a multi-processor system. In FIG. 9, one processor 901 is taken as an example.

The memory 902 is a non-transitory computer readable storage medium provided by embodiments of the present application. The memory stores instructions executable by at least one processor, so that the at least one processor executes the method for processing a transaction request in a blockchain provided by embodiments of the present application. The non-transitory computer readable storage medium of an embodiment of the present application stores computer instructions, which are used to cause the computer to perform the method for processing a transaction request in a blockchain provided by embodiments of the present application.

The memory 902, as a non-transitory computer readable storage medium, may be used to store non-transitory software programs, non-transitory computer executable programs and modules, such as program instructions/modules (for example, the set determination module 801 and the set selection module 802 shown in FIG. 8) corresponding to the method for processing a transaction request in a blockchain in embodiments of the present application. The processor 901 executes various functional applications and data processing of the electronic apparatus by executing the non-transitory software programs, instructions, and modules stored in the memory 902, that is, implements the method for processing a transaction request in a blockchain in foregoing method embodiments.

The memory 902 may include a storage program area and a storage data area, where the storage program area may store an operating system and application programs required by at least one function, and the storage data area may store the data created according to the use of the electronic apparatus, etc. In addition, the memory 902 may include a high-speed random access memory, and may also include a non-transitory memory, such as at least one magnetic disk storage device, a flash memory device, or other non-transitory solid-state storage devices. In some embodiments, the memory 902 may optionally include memories set remotely relative to the processor 901, and these remote memories may be connected to the electronic apparatus for implementing the method for processing a transaction request in a blockchain in an embodiment of the present application through a network. Instances of the above network include but are not limited to the Internet, an intranet, a local area network, a mobile communication network, and combinations thereof.

The electronic apparatus for implementing the method for processing a transaction request in a blockchain in an embodiment of the present application may further include: an input device 903 and an output device 904. The processor 901, the memory 902, the input device 903 and the output device 904 may be connected through a bus or in other ways. In FIG. 9, the connection through a bus is taken as an example.

The input device 903, such as a touch screen, a keypad, a mouse, a trackpad, a touchpad, an indication rod, one or more mouse buttons, a trackball, a joystick, etc. may receive input numeric or character information, and generate key signal inputs related to user settings and function control of the electronic apparatus for implementing the method for processing a transaction request in a blockchain in an embodiment of the present application. The output device 904 may include a display apparatus, an auxiliary lighting device and a tactile feedback device; wherein, the auxiliary lighting device is for example a Light Emitting Diode (LED); the tactile feedback device is for example a vibration motor, and the like. The display apparatus may include, but is not limited to, a liquid crystal display (LCD), an LED display, and a plasma display. In some embodiments, the display apparatus may be a touch screen.

Various embodiments of the systems and techniques described herein may be implemented in digital electronic circuit systems, integrated circuit systems, application specific integrated circuits (ASICs), computer hardware, firmware, software, and/or combination thereof. These various embodiments may include: implementations in one or more computer programs which may be executed and/or interpreted on a programmable system that includes at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computer programs, also called as programs, software, software applications, or codes, include machine instructions of programmable processors, and these computer programs may be implemented using a high-level process and/or object-oriented programming language, and/or an assembly/machine language. As used herein, the terms "machine readable medium" and "computer readable medium" refer to any computer program product, apparatus, and/or device, for example, a magnetic disk, an optical disk, a memory, a programmable logic device (PLD), used to provide machine instructions and/or data to a programmable processor, including the machine readable medium that receives machine instructions as machine readable signals. The term "machine readable signal" refers to any signal used to provide machine instructions and/or data to the programmable processor.

In order to provide interactions with a user, the system and technology described herein may be implemented on a computer which has: a display device, for example a cathode ray tube (CRT) or an LCD monitor, for displaying information to the user; and a keyboard and pointing device, for example a mouse or a trackball, through which the user may provide input to the computer. Other kinds of devices may also be used to provide interactions with a user: for example, the feedback provided to a user may be any form of sensory feedback, for example, visual feedback, auditory feedback, or tactile feedback; and input from a user may be received using any form, including acoustic input, voice input, or tactile input.

The systems and techniques described herein may be implemented in a computing system (for example, as a data server) that includes back-end components, or be implemented in a computing system (for example, an application server) that includes middleware components, or be implemented in a computing system (for example, a user computer with a graphical user interface or a web browser through which the user may interact with the implementation of the systems and technologies described herein) that includes front-end components, or be implemented in a computing system that includes any combination of such back-end components, intermediate components, or front-end components. The components of the system may be interconnected by any form or medium of digital data communication, for example, a communication network. Examples of communication networks include: a Local Area Network (LAN), a Wide Area Network (WAN), the Internet and a blockchain network.

The computer system may include a client and a server. The client and the server are generally remote from each other and typically interact through a communication network. The client-server relationship is generated by computer programs that run on respective computers and have a client-server relationship with each other.

According to technical solutions of embodiments of the present application, during a block generation process, a blockchain node aggregates various transaction requests and divides them into groups according to dependency relationships between transaction requests, to obtain at least one transaction request set, and then determines transaction requests participating in the block generation process by taking a set as unit, which may effectively ensure that dependency relationships between transaction requests during a transaction request process may be taken into account. This solves the problem that a transaction to be processed is selected according to the handling fee, dependency relationships between transactions will be easily ignored, which will lead to errors in subsequent transaction processing. In this way, reasonability of a blockchain node in selecting a transaction request is improved on the basis of guaranteeing a certain reward benefit of a block-generation node.

It should be understood that various forms of processes shown above may be used to reorder, add, or delete steps. For example, respective steps described in the present application may be executed in parallel, or may be executed sequentially, or may be executed in a different order, as long as the desired result of the technical solution disclosed in the present application can be achieved, no limitation is made herein.

The above specific embodiments do not constitute a limitation on the protection scope of the present application. It should be understood by those skilled in the art that various modifications, combinations, sub-combinations, and substitutions may be made according to design requirements and other factors. Any modification, equivalent replacement and improvement, and the like made within the spirit and principle of the present application shall be fall in the protection scope of the present application.

What is claimed is:

1. A method for processing a transaction request in a blockchain, comprising:
    determining, using a directed acyclic graph, at least one transaction request set according to one or more dependency relationships among a plurality of transaction requests in a blockchain network;
    determining a target transaction request set from the at least one transaction request set;
    determining an importance factor of the at least one transaction request set to prioritize selection of the target transaction request set according to payment vouchers and space occupation sizes of the plurality of transaction requests;
    selecting the target transaction request set from the at least one transaction request set according to the importance factor;
    generating a block by performing the plurality of transaction requests in the target transaction request set; and
    after selecting the target transaction request set from the at least one transaction request set:
        repeatedly determining at least one new transaction request set according to one or more dependency relationships among a plurality of remaining transaction requests when a space occupation size of the target transaction request set is less than a block space threshold, the block space threshold corresponding to an upper limit of a block space size; and
        determining a new target transaction request set according to the at least one new transaction request set until the space occupation size is equal to the upper limit of the block space size to generate the block, the plurality of remaining transaction requests including at least one transaction request other than the plurality of transaction requests in the target transaction request set in the blockchain network.

2. The method according to claim 1, wherein selecting the target transaction request set from the at least one transaction request set according to the importance factor comprises:
    constructing a maximum heap by using the importance factor of the at least one transaction request set as a node; and
    determining a transaction request set corresponding to a root node of the maximum heap as the target transaction request set.

3. The method according to claim 1, wherein determining the at least one transaction request set according to the one or more dependency relationships among the plurality of transaction requests in the blockchain network comprises:
    constructing the directed acyclic graph in the blockchain network according to the one or more dependency relationships among the plurality of transaction requests.

4. The method according to claim 3, wherein the at least one transaction request set comprises a leaf transaction request and a non-leaf transaction request on which the leaf transaction request depends, and the leaf transaction request in the at least one transaction request set is different from a leaf transaction request in another transaction request set.

5. The method according to claim 1, wherein determining the importance factor comprises:
    calculating a total payment voucher of all transaction requests in the at least one transaction request set;
    calculating a total space occupation size of all transaction requests in the at least one transaction request set; and
    taking a quotient of the total payment voucher and the total space occupation size as the importance factor of the at least one transaction request set.

6. The method according to claim 1, wherein the blockchain network is deployed with a consensus mechanism for non-competitively generating the block.

7. A device for processing a transaction request in a blockchain, comprising:
    at least one processor; and
    a memory communicatively connected to the at least one processor, the memory storing instructions that, when executed by the at least one processor, cause the at least one processor to:
        determine, using a directed acyclic graph, at least one transaction request set according to one or more dependency relationships among a plurality of transaction requests in a blockchain network;
        determine a target transaction request set from the at least one transaction request set;
        determine an importance factor of the at least one transaction request set to prioritize selection of the target transaction request set according to payment vouchers and space occupation sizes of the plurality of transaction requests;
        select the target transaction request set from the at least one transaction request set according to the importance factor;
        generate a block by performing the plurality of transaction requests in the target transaction request set; and
        after selecting the target transaction request set from the at least one transaction request set:
            repeatedly determine at least one new transaction request set according to one or more dependency relationships among a plurality of remaining transaction requests when a space occupation size of the target transaction request set is less than a block space threshold, the block space threshold corresponding to an upper limit of a block space size; and determine a new target transaction request set according to the at least one new transaction request set until the space occupation size is equal to the upper limit of the block space size to generate the block, the plurality of remaining transaction requests including at least one transaction request other than the plurality of transaction requests in the target transaction request set in the blockchain network.

8. The device according to claim 7, wherein the instructions that cause the at least one processor to select the target transaction request set from the at least one transaction request according to the importance factor further include instructions that cause the at least one processor to:

construct a maximum heap by using the importance factor of the at least one transaction request set as a node; and determine a transaction request set corresponding to a root node of the maximum heap as the target transaction request set.

9. The device according to claim 7, wherein the instructions that cause the at least one processor to determine the at least one transaction request set according to the one or more dependency relationships among the plurality of transaction requests in the blockchain network further include instructions that cause the at least one processor to:

construct the directed acyclic graph in the blockchain network according to the one or more dependency relationships among the plurality of transaction requests.

10. The device according to claim 9, wherein the at least one transaction request set comprises a leaf transaction request and a non-leaf transaction request on which the leaf transaction request depends, and the leaf transaction request in the at least one transaction request set is different from a leaf transaction request in another transaction request set.

11. The device according to claim 7, wherein the instructions that cause the at least one processor to determine the importance factor further include instructions that cause the at least one processor to:

calculate a total payment voucher of all transaction requests in the at least one transaction request set;

calculate a total space occupation size of all transaction requests in the at least one transaction request set; and take a quotient of the total payment voucher and the total space occupation size as the importance factor of the at least one transaction request set.

12. The device according to claim 7, wherein the blockchain network is deployed with a consensus mechanism for non-competitively generating the block.

13. A non-transitory computer readable storage medium for storing computer instructions that, when executed by a computer, cause the computer to:

determine, using a directed acyclic graph, at least one transaction request set according to one or more dependency relationships among a plurality of transaction requests in a blockchain network;

determine a target transaction request set from the at least one transaction request set;

determine an importance factor of the at least one transaction request set to prioritize selection of the target transaction request set according to payment vouchers and space occupation sizes of the plurality of transaction requests;

select the target transaction request set from the at least one transaction request set according to the importance factor;

generate a block by performing the plurality of transaction requests in the target transaction request set; and after selecting the target transaction request set from the at least one transaction request set:

repeatedly determine at least one new transaction request set according to one or more dependency relationships among a plurality of remaining transaction requests when a space occupation size of the target transaction request set is less than a block space threshold, the block space threshold corresponding to an upper limit of a block space size; and determine a new target transaction request set according to the at least one new transaction request set until the space occupation size is equal to the upper limit of the block space size to generate the block, the plurality of remaining transaction requests including at least one transaction request other than the plurality of transaction requests in the target transaction request set in the blockchain network.

* * * * *